(12) United States Patent
Sugaya

(10) Patent No.: US 10,755,094 B2
(45) Date of Patent: Aug. 25, 2020

(54) INFORMATION PROCESSING APPARATUS, SYSTEM AND PROGRAM FOR EVALUATING CONTRACT

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/344,962

(22) PCT Filed: Nov. 10, 2016

(86) PCT No.: PCT/JP2016/083382
§ 371 (c)(1),
(2) Date: Apr. 25, 2019

(87) PCT Pub. No.: WO2018/087863
PCT Pub. Date: May 17, 2018

(65) Prior Publication Data
US 2019/0272421 A1    Sep. 5, 2019

(51) Int. Cl.
*G06K 9/00* (2006.01)
*G06Q 10/06* (2012.01)
*G06N 20/00* (2019.01)
*G06N 3/08* (2006.01)
*G06F 16/00* (2019.01)

(52) U.S. Cl.
CPC ......... *G06K 9/00469* (2013.01); *G06F 16/00* (2019.01); *G06N 3/08* (2013.01); *G06N 20/00* (2019.01)

(58) Field of Classification Search
CPC ...... G06K 9/00469; G06N 3/08; G06N 20/00; G06Q 10/06
See application file for complete search history.

(56) References Cited

U.S. PATENT DOCUMENTS

| | | | |
|---|---|---|---|
| 7,797,301 B1* | 9/2010 | Baird | G06F 3/0482 707/706 |
| 9,367,606 B1* | 6/2016 | Lu | G06N 3/08 |
| 2002/0073065 A1* | 6/2002 | Inaba | G06F 16/335 |

(Continued)

FOREIGN PATENT DOCUMENTS

| | | |
|---|---|---|
| JP | 1997-016627 | 1/1997 |
| JP | 1998-210071 | 8/1998 |

(Continued)

*Primary Examiner* — Yubin Hung
(74) *Attorney, Agent, or Firm* — Lex IP Meister, PLLC

(57) ABSTRACT

An acquiring unit includes a first acquiring unit, a second acquiring unit, and an extracting unit. The first acquiring unit acquires first data from contract data indicating a contract. The second acquiring unit acquires, from an information source other than contract data, second data different from the first data by using the first data acquired by the first acquiring unit. The extracting unit extracts features of the contract from first data acquired by the first acquiring unit and second data acquired by the second acquiring unit. The features include at least second data. A calculating unit calculates an evaluation value of the contract according to a user, by using the features of the contract acquired by the acquiring unit and a calculation criterion read from a calculation criterion DB.

3 Claims, 10 Drawing Sheets

(56) References Cited

U.S. PATENT DOCUMENTS

| | | | |
|---|---|---|---|
| 2003/0078800 A1* | 4/2003 | Salle | G06Q 30/02 705/400 |
| 2003/0120507 A1* | 6/2003 | Aasman | G06Q 10/10 705/1.1 |
| 2005/0024679 A1* | 2/2005 | Yoda | G06K 9/00993 358/1.15 |
| 2006/0190304 A1* | 8/2006 | Kobayashi | G06Q 40/08 705/4 |
| 2007/0136126 A1* | 6/2007 | Notani | G06Q 30/0603 705/80 |
| 2007/0233690 A1* | 10/2007 | Bruchlos | G06Q 30/02 |
| 2008/0071630 A1* | 3/2008 | Donahue | G06Q 10/063 705/7.11 |
| 2008/0109454 A1* | 5/2008 | Willse | G06F 16/313 |
| 2009/0248675 A1* | 10/2009 | Kawabata | G06F 16/33 |
| 2011/0004588 A1* | 1/2011 | Leitersdorf | G06F 16/951 707/711 |
| 2011/0319171 A1* | 12/2011 | Ngozika | A63F 13/85 463/42 |
| 2012/0226661 A1* | 9/2012 | Kenthapadi | G06F 16/951 707/634 |
| 2013/0007607 A1* | 1/2013 | Caldwell | G06F 40/157 715/259 |
| 2013/0159695 A1* | 6/2013 | Chiueh | G06F 21/6227 713/150 |
| 2014/0129276 A1* | 5/2014 | Agrawal | G06Q 10/0637 705/7.15 |
| 2015/0254555 A1* | 9/2015 | Williams, Jr. | G06N 3/0454 706/14 |
| 2016/0217209 A1* | 7/2016 | Beamon | G06F 16/334 |
| 2016/0253688 A1* | 9/2016 | Nielsen | G06Q 30/0202 705/7.31 |
| 2016/0292803 A1* | 10/2016 | Morimoto | G06Q 50/18 |
| 2017/0098192 A1* | 4/2017 | Follis | G06Q 10/10 |
| 2017/0154391 A1* | 6/2017 | Watkins | G06Q 50/18 |
| 2018/0121551 A1* | 5/2018 | Krasadakis | G06F 16/3322 |

FOREIGN PATENT DOCUMENTS

| | | |
|---|---|---|
| JP | 2014-519633 | 8/2014 |
| JP | 2014-238629 | 12/2014 |

* cited by examiner

FIG. 10

| Layer number l | Unit number i | Weight number j | Weighting factor |
|---|---|---|---|
| ... | ... | ... | ... |
| ... | ... | ... | ... |
| ⋮ | ⋮ | ⋮ | ⋮ |

1222

INFORMATION PROCESSING APPARATUS, SYSTEM AND PROGRAM FOR EVALUATING CONTRACT

TECHNICAL FIELD

The present invention relates to an information processing apparatus, an information processing system, and a program for evaluating a contract.

BACKGROUND ART

When checking a plurality of documents, it is desirable to know which of the documents is important before the check. For example, a business manager who should routinely check many contracts wants to check contracts in the order of importance. Therefore, techniques are being considered to evaluate how important documents such as contracts are.

Patent Document 1 describes a document search method that uses an artificial intelligence model to score documents and select a subset of the highest scored documents.

Patent Document 2 describes a contract analysis system that generates a document vector for each clause on input contract data, compares the document vector for each clause with a document vector for each clause group to specify a legal provision included in the similar clause group as a related provision of the contract clause, and generates an analysis result screen that lists the related provisions for each contract clause.

PRIOR ART DOCUMENT

Patent Document

Patent Document 1: Japanese Patent Application Publication No. 2014-519633
Patent Document 2: Japanese Patent Application Publication No. 2014-238629

SUMMARY OF THE INVENTION

Technical Problem

By the way, the manager often judges the importance of the contract, considering a background of the contract based on the experience. For example, although a name of a counterpart company is described in a general contract, a background such as a business performance of the counterpart company this year or a business condition of a parent company is not described. However, such a background may influence the importance of the contract. Therefore, particularly, regarding the importance of the contract, not only the contents described in the contract but also circumstances not described should be considered.

In addition, for example, a contract for a joint research or confidential agreement is important for a person in charge of intellectual property, and a contract for a labor or social insurance is important for a person in charge of personnel. The importance of each contract may differ depending on the job or the like. Furthermore, even if persons' positions are the same, the importance of each contract may differ depending on their preferences or specialties. In other words, the importance of each contract varies depending on users.

However, the technology described in Patent Document 1 does not perform scoring specialized in the contract. Further, the technology refers to the metadata of the document but does not perform scoring with reference to data not included in the document. Furthermore, the technology described in Patent Document 2 analyzes the contract, but does not use data not included in the contract and does not evaluate the contract depending on the user.

The present invention has been made in view of such circumstances, and its object is to improve calculation accuracy of an evaluation value of a contract.

Technical Solution

In order to achieve the above object, an information processing apparatus according to the present invention includes an acquiring unit that acquires a plurality of features of a contract by using data indicating the contract, a storage unit that stores a calculation criterion which is set for a user and used for calculating an evaluation value of the contract, and a calculating unit that calculates an evaluation value of the contract corresponding to the user by using the plurality of features and the calculation criterion.

Effects of the Invention

By using the present invention, the calculation accuracy of the evaluation value of the contract can be improved.

BRIEF DESCRIPTION OF THE DRAWINGS

FIG. 10 is a diagram showing an example of a calculation criterion 1222 in a modified example.

DESCRIPTION OF REFERENCE NUMBERS

1: information processing apparatus, 11: control unit, 111: acquiring unit, 1111: first acquiring unit, 1112: second acquiring unit, 1113: extracting unit, 112: calculating unit, 113: accepting unit, 114: learning unit, 115: authenticating unit, 116: presenting unit, 12: storage unit, 121: contract DB, 1211: contract ID list, 1212: contract data, 1213: feature table, 122: calculation criterion DB, 1221: user ID list, 1222: calculation criterion, 123: user DB, 13: communication unit, 14: display unit, 15: operation unit, 2: server apparatus, 21: control unit, 22: storage unit, 23: communication unit, 3: communication line, 9: information processing system.

DETAILED DESCRIPTION OF THE EMBODIMENTS

1. Embodiment 1-1. Overall Configuration

Figure 1:
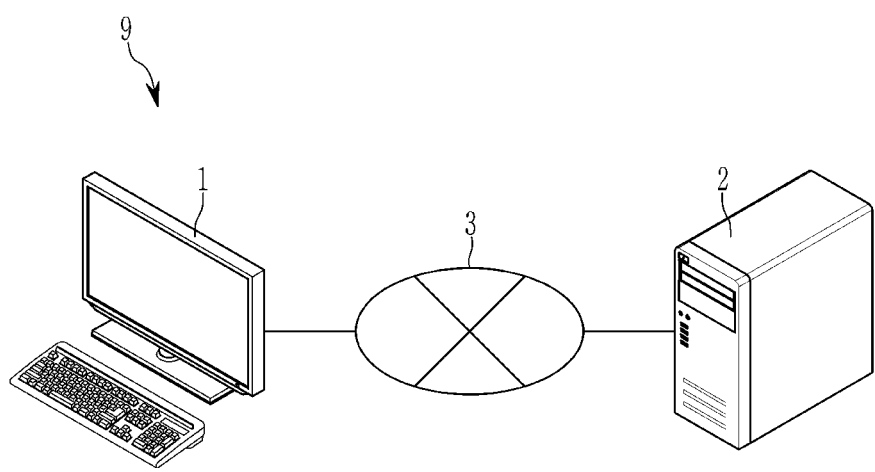
FIG. 1 is a diagram showing an example of an overall configuration of an information processing system 9 according to the present invention.

FIG. 1 is a diagram showing an example of an overall configuration of an information processing system 9 according to the present invention. The information processing system 9 includes, for example, a communication line 3 configuring a LAN (Local Area Network), an information processing apparatus 1 connected to the communication line 3, and a server apparatus 2. The communication line 3 may include a WAN (Wide Area Network), a public telephone line, and the like.

While the number of the information processing apparatus 1 is one in the information processing system 9 shown in FIG. 1, there may be a plurality of information processing apparatuses 1. Further, there may be a plurality of server apparatuses 2 and a plurality of communication lines 3.

1-2. Configuration of Information Processing Apparatus 1

Figure 2:
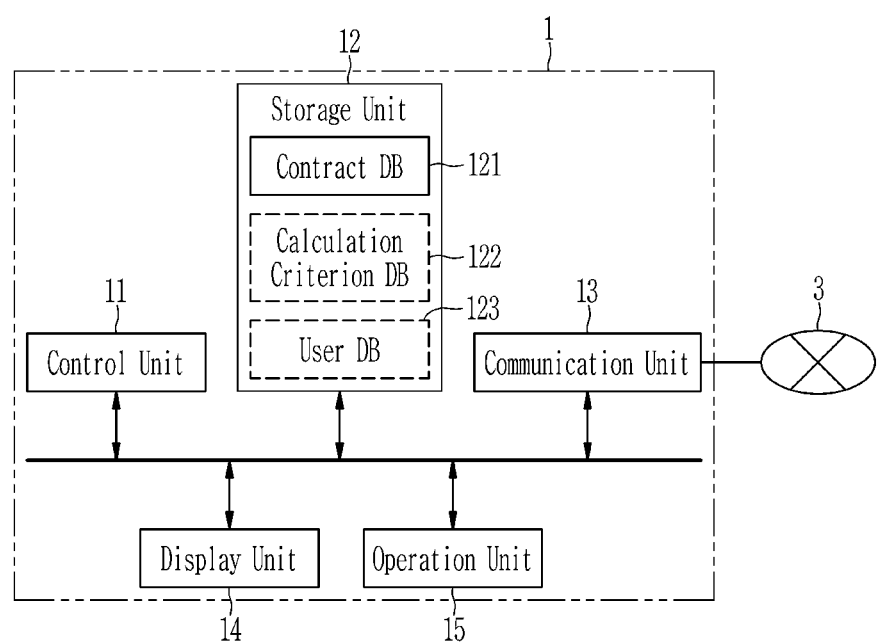
FIG. 2 is a diagram showing a configuration of an information processing apparatus 1.

FIG. 2 is a diagram showing a configuration of an information processing apparatus 1. The information processing apparatus 1 includes a control unit 11, a storage unit 12, a communication unit 13, a display unit 14, and an operation unit 15. The control unit 11 includes a CPU (Central Processing Unit), a ROM (Read Only Memory), and a RAM (Random Access Memory). The CPU controls each unit of the information processing apparatus 1 by reading and executing a computer program (hereinafter, simply referred to as a "program") stored in the ROM or the storage unit 12.

The communication unit 13 is a communication circuit connected to the communication line 3 by wire or wirelessly. The communication unit 13 functions as a communication interface that performs data communication with the server apparatus 2 via the communication line 3 in the information processing apparatus 1.

The operation unit 15 includes operation elements such as operation buttons for inputting various instructions, receives an operation by the user, and provides a signal corresponding to the content of the operation to the control unit 11. The operation unit 15 may further include a touch panel for detecting an operation object such as a user's finger or a stylus pen.

The display unit 14 includes a liquid crystal display, and displays an image under the control of the control unit 11. The transparent touch panel of the operation unit 15 may be overlapped on the liquid crystal display of the display unit 14.

The storage unit 12 is a large-capacity memory or storage means, such as a hard disk drive or a solid state drive, and stores various programs to be read by the CPU of the control unit 11. In addition, the storage unit 12 may store a contract database (hereinafter described as a "DB") 121 that is a database storing a contract, a calculation criterion DB 122 that is a database storing a calculation criterion which is a criterion for calculating an evaluation value of the contract, and a user DB 123 that is a database storing a set of identification information of a user and authentication information.

Figure 3:
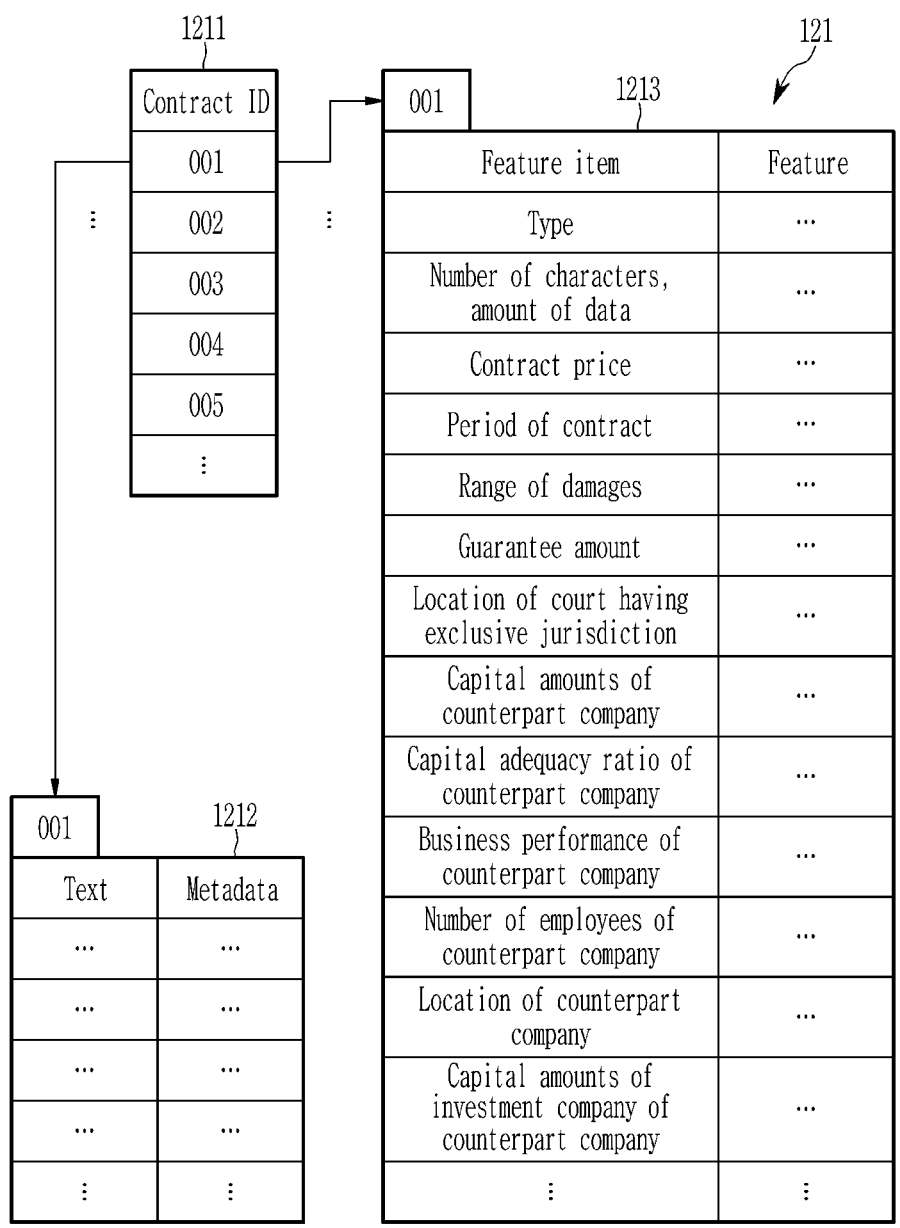
FIG. 3 is a diagram showing an example of a contract DB 121.

FIG. 3 is a diagram showing an example of a contract DB 121. The contract DB 121 shown in FIG. 3 includes a contract ID list 1211, contract data 1212, and a feature table 1213.

The contract ID list 1211 is a list of contract IDs that are identification information of the contracts. The contract data 1212 are data of a contract associated with one contract ID described in the contract ID list 1211.

The contract data 1212 include a text described as the content of the contract and metadata that is included in an electronic file but is not described as the content of the contract. The control unit 11 refers to both the text and the metadata of the contract data 1212.

The feature table 1213 is an area for storing a feature group of the contract that is associated with one contract ID described in the contract ID list 1211. The feature table 1213 stores a feature item indicating an item of a feature and the feature which is a value of the feature item in the contract of the contract ID in association with each other. When acquiring a feature of a contract identified by a contract ID by using data indicating the contract, the control unit 11 writes the acquired feature to the feature table 1213 associated with its contract ID. That is, the control unit 11 acquires a plurality of features of the contract by using the data indicating the contract.

The feature items described in the feature table 1213 shown in FIG. 3 include, for example: a type of the contract; the number of characters; an amount of data; a contract price specified in the contract; a period of the contract; a range of damages; a location of a court having exclusive jurisdiction; a capital adequacy ratio, a business performance, the number of employees, assets, and a location in a counterpart company and an investment company of the counterpart company; and a guarantee amount for the agreement specified in the contract.

The above-described business performance may be represented by financial indicators such as an operating profit, an ordinary profit, and a net profit, and may be represented by indicators related to a stock price such as a volume and an expected fluctuation rate. Further, the above-described assets may be real estate such as land, buildings or standing trees, movable assets such as equipment or facilities, or intellectual property such as patents.

When the feature stored in the feature table 1213 is not acquired by the control unit 11, for example, it may be shown that the feature is undecided because a feature exceeding the determined range is stored or a flag associated with the feature item is rewritten. In addition, an expiration date may be set for the feature acquired once. In this case, the acquisition date or expiration date of the feature may be written in association with the feature item.

Figure 4:
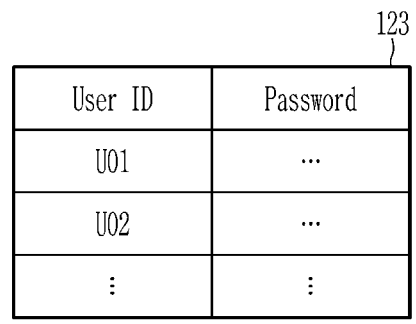
FIG. 4 is a diagram showing an example of a user DB 123.

FIG. 4 is a diagram showing an example of a user DB 123. The user DB 123 stores a user ID that is identification information of a user and a password that is known only to the user in association with each other. When the user inputs a pair of a user ID and a password via an operation unit 15, a control unit 11 authenticates the user with reference to the user DB 123.

Figure 5:
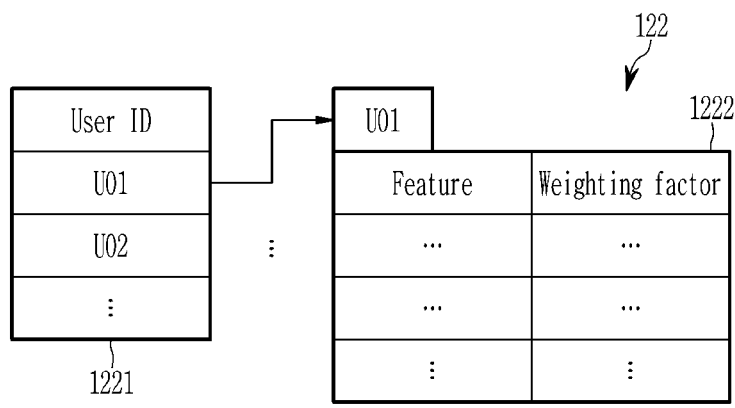
FIG. 5 is a diagram showing an example of a calculation criterion DB 122.

FIG. 5 is a diagram showing an example of a calculation criterion DB 122. The calculation criterion DB 122 includes a user ID list 1221 that is a list of user IDs, and a calculation criterion 1222 that describes a weighting factor group used when an evaluation value of a contract is evaluated. In FIG. 5, the calculation criterion 1222 stores a weighting factor for each feature. Further, one calculation criterion 1222 is associated with one user ID.

The control unit 11 refers to the calculation criterion DB 122 to acquire a weighting factor group determined for each user, and executes calculation of an evaluation value of a contract by using the weighting factor group. That is, the storage unit 12 stores the calculation criterion that is set for the user and used for calculating the evaluation value of the contract. The control unit 11 then calculates the evaluation value of the contract corresponding to the user, by using a plurality of features of the contract and the calculation criterion stored in the storage unit 12.

1-3. Configuration of Server Apparatus

Figure 6:
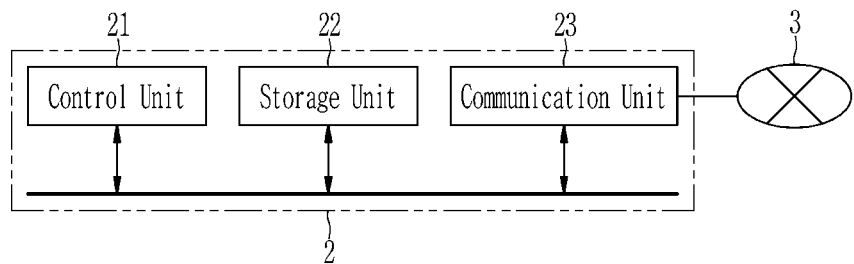
FIG. 6 is a diagram showing an example of a configuration of a server apparatus 2.

FIG. 6 is a diagram showing an example of a configuration of a server apparatus 2. A control unit 21 includes a CPU, a ROM, and a RAM, and the CPU controls each unit of the server apparatus 2 by reading and executing a program stored in the ROM.

A communication unit 23 is a communication circuit connected to a communication line 3 by wire or wirelessly. The communication unit 23 functions as a communication interface that performs data communication with the information processing apparatus 1 via the communication line 3 in the server apparatus 2.

A storage unit 22 is large-capacity storage means such as a hard disk drive, and stores various programs to be read by the CPU of the control unit 21. Further, the storage unit 22 stores features corresponding to data (referred to as "first data") included in a contract.

The control unit 21 receives a request from the information processing apparatus 1 via the communication unit 23, extracts designated features corresponding to the first data from the storage unit 22 by using the first data included in the request, and transmits the features to the information processing apparatus 1.

1-4. Functional Configuration of Information Processing Apparatus

Figure 7:
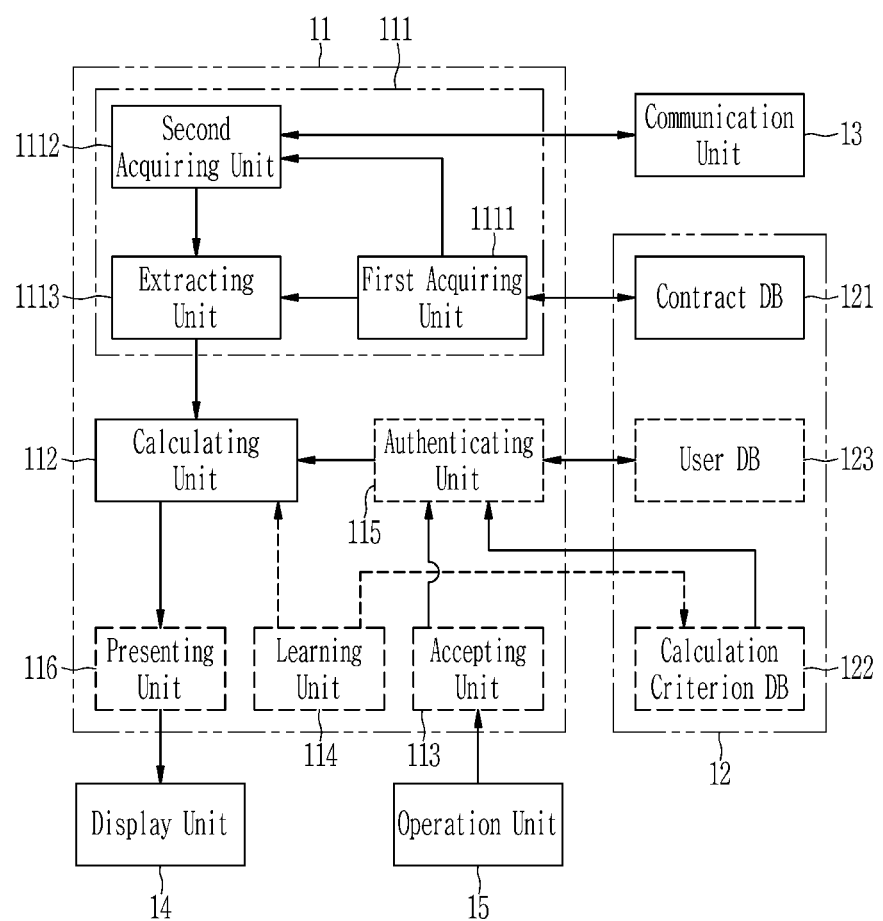
FIG. 7 is a diagram showing an example of a functional configuration of an information processing apparatus 1.

FIG. 7 is a diagram showing an example of a functional configuration of an information processing apparatus 1. A control unit 11 of the information processing apparatus 1 functions as an acquiring unit 111 and a calculating unit 112 by executing a program read from a storage unit 12. Further, as shown in FIG. 7, the control unit 11 may function as an accepting unit 113, a learning unit 114, an authenticating unit 115, and a presenting unit 116.

When a contract is designated by the user, the acquiring unit 111 reads data indicating the contract from a contract DB 121, and acquires a plurality of features of the contract.

For example, the acquiring unit 111 shown in FIG. 7 includes a first acquiring unit 1111, a second acquiring unit 1112, and an extracting unit 1113. The first acquiring unit 1111 acquires the above-described first data from a text and metadata of contract data 1212 that are data indicating the contract. The first data are data included in the contract data 1212 regardless of whether they are described as the content of the contract.

The second acquiring unit 1112 acquires second data that are different from the first data from an information source other than the contract data 1212, by using the first data acquired by the first acquiring unit 1111. The second data are data that are related to the first data but are not included in the contract data 1212. Here, the second acquiring unit 1112 is connected to a communication line 3 and a server apparatus 2 via a communication unit 13, and requests the second data associated with the first data from the server apparatus 2. In response to this request, the server apparatus 2 transmits the second data associated with the first data.

The extracting unit 1113 extracts the plurality of features of the contract from the first data acquired by the first acquiring unit 1111 and the second data acquired by the second acquiring unit 1112. The plurality of features include at least the second data. As a result, the acquiring unit 111 shown in FIG. 7 acquires the features of the contract designated by the user through the functions of the first acquiring unit 1111, the second acquiring unit 1112 and the extracting unit 1113.

In the information processing apparatus 1 shown in FIG. 7, the accepting unit 113 accepts various operations such as an operation for login from the user or an operation for correcting the calculated evaluation value through the operation unit 15. When the accepting unit 113 accepts the operation for login from the user, the authenticating unit 115 authenticates the user with reference to a user DB 123. If the authentication is successful, the authenticating unit 115 reads a calculation criterion 1222 associated with a user ID of the user from the calculation criterion DB 122 and transmits it to the calculating unit 112.

The calculating unit 112 calculates an evaluation value of the contract according to the user, by using the features of the contract acquired by the acquiring unit 111 and the calculation criterion 1222 read from the calculation criterion DB 122. In this case, the calculating unit 112 calculates the evaluation value of the contract using the first data acquired by the first acquiring unit 1111 and the second data acquired by the second acquiring unit 1112.

The accepting unit 113 shown in FIG. 7 accepts an evaluation of the contract from the user. For example, the accepting unit 113 accepts the evaluation of the contract based on an operation which the user performs on contract data 1212 that are data indicating the contract. This operation may be any operation, and is, for example, an operation for correcting the calculated evaluation value. The operation for correcting the evaluation value of the contract is an operation of indicating the user's evaluation on the contract, and means an instruction to correct the calculated evaluation value so as to approach the user's evaluation.

The evaluation of the contract accepted by the accepting unit 113 may be an evaluation value, or may be a relative evaluation compared to the evaluation of the other contract. The relative evaluation is performed, for example, by an operation of rearranging a plurality of contracts arranged in order of evaluation value.

The learning unit 114 causes the calculating unit 112 to learn by using the evaluation of the user accepted by the accepting unit 113. Specifically, the learning unit 114 rewrites the calculation criterion 1222 stored in the calculation reference DB 122 so as to match the evaluation received from the user and brings the calculated evaluation value closer to the user's evaluation.

Further, the calculation criterion 1222 before its content is rewritten by the learning unit 114 may be set to one according to the job and position of the user as an initial value. For example, if the user is in charge of intellectual property, the calculation criterion 1222 in the initial state of the user may be set so that it is evaluated that the contract for the joint research or confidential agreement is important. Furthermore, if the user is in charge of human resources, the calculation criterion 1222 in the initial state of the user may be set so that it is evaluated that the contract for labor and social insurance is important.

The presenting unit 116 shown in FIG. 7 arranges and presents the plurality of contracts based on the evaluation values calculated by the calculation unit 112 respectively. The presenting unit 116 presents the plurality of contracts arranged in order of evaluation value to the user, for example, while the display unit 14 displays their contract IDs.

1-5. Operation of Information Processing System

Figure 8:
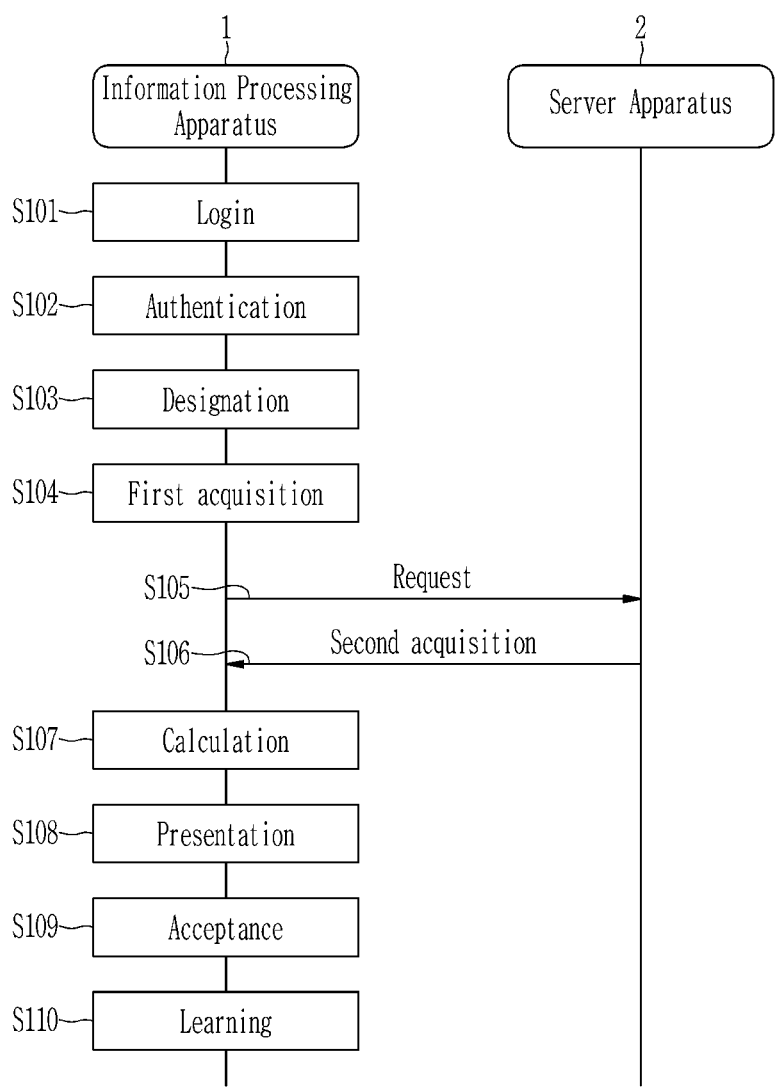
FIG. 8 is a sequence diagram for explaining a flow of an operation of an information processing system 9.

FIG. 8 is a sequence diagram for explaining a flow of an operation of an information processing system 9. Upon accepting a login operation from a user (step S101), an information processing apparatus 1 refers to a user DB 123 to search for a pair of a user ID and password inputted by the user and authenticates the user (step S102).

When accepting an operation of designating a contract from the user (step S103), the information processing apparatus 1 reads contract data 1212 indicating the contract from a contract DB 121, and acquires first data from a text and metadata constituting the contract data 1212 (step S104).

The information processing apparatus 1 transmits any of the acquired first data to the server apparatus 2 to request second data associated with the first data (step S105). The server apparatus 2 transmits the second data in response to the request, and the information processing apparatus 1 acquires the second data (step S106).

Upon extracting features of the contract from the acquired first data and second data, the information processing apparatus 1 calculates an evaluation value of the contract according to the user by using the features and a calculation criterion 1222 read from a calculation criterion DB 122 (step S107).

When calculating evaluation values for a plurality of contracts, the information processing apparatus 1 arranges and presents the contracts in order of evaluation value (step S108).

Further, when receiving an evaluation of the contract from the user (step S109), the information processing apparatus 1 rewrites the calculation criterion 1222 stored in the calculation reference DB 122 so as to match the evaluation received from the user. Thus, the information processing apparatus 1 learns the user's evaluation of the contract (step S110).

As described above, since the information processing system 9 according to the present invention captures the feature of the contract also using an information source other than the data of the contract, the calculation accuracy of the evaluation value of the contract is improved.

2. Modified Examples

While an embodiment has been described above, the contents of the present embodiment can be modified as follows. Further, the following modified example may be combined.

2-1. Modified Example 1

In the above-described embodiment, one calculation criterion 1222 is associated with one user ID. However, one calculation criterion 1222 may not be associated with one user ID. In this case, a calculating unit 112 may calculate an evaluation value of a contract by using a calculation criterion that is common to all users and features of the contract acquired by an acquiring unit 111. Further, in this case, a calculation criterion DB 122 may not have a user ID list 1221 as long as the calculation criterion 1222 is included.

In addition, the acquiring unit 111 may request third data corresponding to second data from, for example, another server apparatus 2, by using the second data acquired by a second acquiring unit, and acquire the third data. Further, the acquiring unit 111 may request other data from another server apparatus 2 by using the third data.

The calculating unit 112 may calculate the evaluation value by using these data acquired from the server apparatus 2 as the features.

2-2. Modified Example 2

In the above-described embodiment, an acquiring unit 111 includes a first acquiring unit 1111, a second acquiring unit 1112, and an extracting unit 1113. However, as long as a plurality of features of a contract are acquired by using data indicating the contract, the functions may not be divided into the first acquiring unit 1111, the second acquiring unit 1112, and the extracting unit 1113.

2-3. Modified Example 3

In the above-described embodiment, the control unit 11 functions as an accepting unit 113 that accepts an operation for correcting an evaluation value calculated for a contract from a user. However, the control unit 11 may not have this function. In this case, the control unit 11 may not have a function of causing a calculating unit 112 to learn.

2-4. Modified Example 4

In the above-described embodiment, an accepting unit 113 accepts an operation for correcting an evaluation value calculated for a contract from a user. However, this operation is not limited to explicitly correct the evaluation value. The accepting unit 113 may accept an evaluation of the contract based on an operation which the user performs on data indicating the contract.

For example, the accepting unit 113 may accept an operation for rearranging identification information (names or the like) of listed contracts in order of importance as an operation for instructing to correct the evaluation values calculated for the contracts. Since this operation is to rearrange the identification information of one contract and the other contract, it is an operation indicating a relative relationship between the evaluation of the user on one contract and the evaluation of the user on the other contract. In this case, the accepting unit 113 accepts the evaluation of the user the one contract compared with the other contract.

In addition, when accepting an operation for deleting all pages of the contract without browsing them, the accepting unit 113 may accept the operation as an operation for correcting the evaluation value calculated for the contract downward. In this case, the accepting unit 113 accepts an evaluation according to a type of processing that is executed on one contract, based on the operation of the user.

In other words, a control unit 11 may function as an accepting unit that converts the operation which the user performs on the contract into the evaluation of the contract by the user in accordance with a determined rule, and accept the evaluation. The accepting unit 113 realized by the control unit 11 accepts the evaluation of the contract based on the operation which the uses performs on the data indicating the contract.

2-5. Modified Example 5

In the above-described embodiment, a presenting unit 116 arranges and presents a plurality of contracts based on evaluation values calculated by a calculating unit 112. However, the method of presentation is not limited to the arrangement. For example, the presenting unit 116 may present one contract with the highest evaluation value among a plurality of contracts, or may present a predetermined number of contracts in descending order of evaluation value. In addition, the presenting unit 116 may present one contract with the lowest evaluation value among the plurality of contracts. A target to be presented in the contract may be information of the contract, such as the content or identification information of the contract.

That is, the presenting unit 116 may present the information of the contract according to the evaluation value calculated by the calculating unit 112. A control unit 11 may not function as the presenting unit 116. In this case, the information processing apparatus 1 may output the evaluation value calculated by the calculating unit 112 to, for example, another apparatus.

2-6. Modified Example 6

In the above-described embodiment, feature items shown in FIG. 3 are described as an example of feature items described in a feature table 1213. However, the feature items are not limited thereto. In short, the feature items may be anything that indicates features of a contract.

For example, the feature items may include a research expense ratio indicating a ratio of research expenses to an amount of income, a researcher ratio whose numerator is the total number of officers and researchers and whose denominator is the number of researchers, or the like, in a counterpart company and an investment company of the counterpart company. Further, the feature items may include the number of papers published by the researchers, the number of citations on the papers, a type or number of standards recognized by a government or non-governmental organization, the number of recognized years, or the like.

Furthermore, the feature items may include the presence or absence of a predetermined character string or its matching degree. In this case, the plurality of features of the contract are determined by comparing the character string included in the contract with a predetermined character string described in the feature table 1213.

2-7. Modified Example 7

In the above-described embodiment and modified examples, a presenting unit 116 presents information of a contract in accordance with to an evaluation value calculated by a calculating unit 112. However, the presenting unit 116 may present the information of the contract based on an evaluation value which the calculating unit 112 should calculate for one or more designated users.

For example, in a case where a user (referred to as "user A") who operates an information processing apparatus 1 designates another user (referred to as "user B") of an information processing system 9, the presenting unit 116 may present to the user A an evaluation value that should be calculated when an evaluation value of a certain contract is presented to the user B. In this case, in addition to the evaluation value calculated for the user A, the user A can know the evaluation value to be calculated for the user B as a reference. That is, the presenting unit 116 presents to one user the information of the contract based on the evaluation value that is calculated for the other user by the calculating unit 112.

The number of users to be designated may be one, or may be two or more. Further, in a case where a user designates a plurality of users, the user may be included in the plurality of users, or may not be included in the plurality of users. The method of designating the user may be a method of designating identification information of the user, or may be a method of designating a condition to be satisfied by the user.

The condition for designating a user may be, for example, a condition of "belonging to a company recording performance above a threshold" or a condition of "being in charge of intellectual property business in a company to which employees above a threshold belong".

2-8. Modified Example 8

In addition, a presenting unit 116 may determine the order in which contracts should be circulated to a plurality of users, based on evaluation values that are calculated for the plurality of users by a calculating unit 112, and may present the determined order.

2-9. Modified Example 9

In the above-described embodiment, a storage unit 12 of an information processing apparatus 1 stores a calculation criterion that is used for calculating an evaluation value of a contract in accordance with the user. Further, a control unit 11 of the information processing apparatus 1 executes a program read from the storage unit 12, thereby functioning as an acquiring unit 111 that acquires a plurality of features of the contract by using data indicating the contract, a calculating unit 112 that calculates an evaluation value of the contract according to the user by using the plurality of features and the calculation criterion, and a presenting unit 116 that arranges and presents a plurality of contracts based on the evaluation values which are respectively calculated by calculating unit 112. However, as long as the storage unit for storing the calculation criterion, the acquiring unit 111 for acquiring the features, the calculating unit for calculating the evaluation value, and the presenting unit for presenting information of the contract according to the evaluation value calculated by the calculating unit can be realized by any of the devices constituting the information processing system 9, they may not be realized by the information processing apparatus 1.

In other words, the information processing system 9 may not include an acquiring unit that acquires the plurality of features of the contract by using data indicating the contract, the storage unit that stores the calculation criterion which is used for calculating the evaluation value of the contract according to the user, the calculating unit that calculates the evaluation value of the contract corresponding to the user by using the plurality of features and the calculation criterion, and the presenting unit that presents the contract in accordance with the evaluation value calculated by the calculating unit.

2-10. Modified Example 10

A program executed by a control unit 11 of an information processing apparatus 1 or a control unit 21 of a server apparatus 2 can be provided as stored in a computer-readable recording medium such as a magnetic recording medium such as a magnetic tape or a magnetic disk, an optical recording medium such as an optical disk, an optical magnetic recording medium, or a semiconductor memory. Further, the program can be downloaded via a communication line such as the Internet. Furthermore, various devices other than a CPU may be applicable as control means exemplified by the control unit 11 and the control unit 21. For example, a dedicated processor is used.

2-11. Modified Example 11

In the above-described embodiment, a calculation criterion 1222 included in a calculation criterion DB 122 stores a weighting factor for each feature. However, the weighting factor may not be associated with each feature. The calculation criterion 1222 may include, for example, a plurality of weighting factors in a so-called multilayer perceptron.

Figure 9:
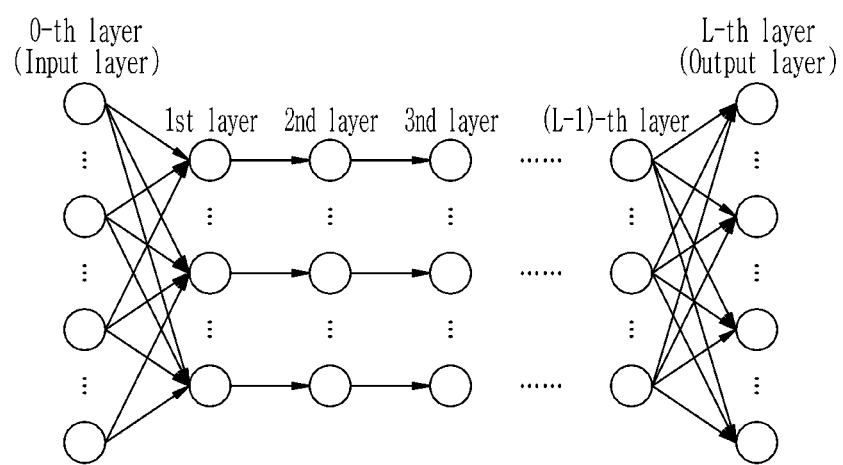
FIG. 9 is a diagram showing an example of a multilayer perceptron.

FIG. 9 is a diagram showing an example of a multilayer perceptron. As shown in FIG. 9, an information processing apparatus 1 may input a vector of input values including features of a contract to the 0-th layer (an input layer), calculate values of the L-th layer (an output layer) through calculation of a hidden layer (an intermediate layer) of the (L-1)-th layer, and calculate the above-described evaluation value of the contract based on the values of the output layer. The information processing apparatus 1 performs, for example, calculation according to the following equation 1.

$$u(x) = x_i^{(l)} = \Sum_{i=0}(w_{i,j}^{(l)} \cdot x_j^{(l-1)})$$ Equation 1

In Equation 1, an upper right bracketed subscript is a layer number, a lower right and left subscript is a unit number in a layer of interest, and a lower right and right subscript is a unit number in a layer immediately before the corresponding layer and is a unit number (a weighting number) to which a weighting factor is multiplied when calculating a value of the unit number in the layer number.

According to Equation 1, the value $x_i^{(l)}$ of unit number i in layer number l is calculated by adding products, each of the value $x_j^{(l-1)}$ of each unit in the immediately preceding layer (layer number (l-1)) and a weighting factor $w_{i,j}^{(l)}$ determined in association with the unit number i in the layer number l.

When a control unit 11 functions as a calculating unit 112, a plurality of features of a contract are inputted as a feature vector to the 0-th layer (the input layer) shown in FIG. 9. The features inputted to the 0-th layer are calculated by using the determined weighting factors, respectively, and are inputted to a next layer including a plurality of units, that is, the first layer. Subsequently, the values of the first layer are used to calculate values of respective units in a next layer by using the weighting factors assigned to each layer, and then the values are sequentially propagated to a next layer. Further, each layer may include a constant called a bias layer.

Figure 10:
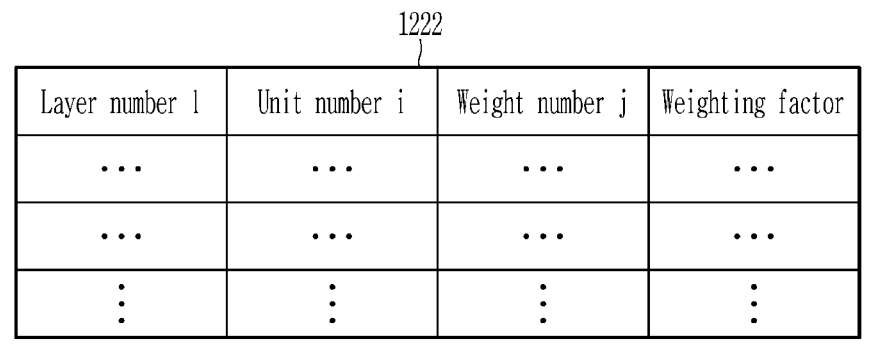

FIG. 10 is a diagram showing an example of a calculation criterion 1222 in the present modified example. Here, a weighting factor is a factor for calculating a value of a unit constituting a certain layer. Specifically, each of the weighting factors $w_{i,j}^{(l)}$ is specified in a set of a number (layer number 1) of the corresponding layer, a number (unit number i) of a unit whose value is calculated in the corresponding layer, and a number (weight numbers j) of a unit to which a weighting factor is multiplied in a layer which is placed immediately before the corresponding layer.

In other words, the calculating unit 112 realized by the control unit 11 may calculate the evaluation value of the contract by repeating a process of calculating a sum of values, each being obtained by multiplying the value of each unit constituting a certain layer in the multilayer perceptron shown in FIG. 9 by, for example, the weighting factor corresponding to the value of each unit in the immediately preceding layer.

In addition, a learning unit 114 may cause the calculating unit 112, which calculates the evaluation value by using the above-described calculation criterion 1222, to learn by using an evaluation of the user accepted by an accepting unit 113 and by applying a backpropagation method, a probabilistic gradient descent method, or the like.

What is claimed is:

1. An information processing apparatus comprising:
a processor that acquires a plurality of features of a contract by using data indicating the contract; and
a storage device that stores a calculation criterion which is set for a user and used for calculating an evaluation value of the contract,
wherein the processor:
calculates an evaluation value of the contract corresponding to the user by using the plurality of features and the calculation criterion; and
determines an order in which the contract should be circulated to a plurality of the users, based on the evaluation values which are calculated for the plurality of users, and presents the determined order.

2. An information processing method comprising:
acquiring a plurality of features of a contract by using data indicating the contract;
storing a calculation criterion which is set for a user and used for calculating an evaluation value of the contract;
calculating an evaluation value of the contract corresponding to the user by using the plurality of features and the calculation criterion; and
determining an order in which the contract should be circulated to a plurality of the users, based on the evaluation values which are calculated for the plurality of users, and presenting the determined order.

3. A non-transitory computer-readable medium that stores a program for causing a computer to execute:
acquiring a plurality of features of a contract by using data indicating the contract;
storing a calculation criterion which is set for a user and used for calculating an evaluation value of the contract;
calculating an evaluation value of the contract corresponding to the user by using the plurality of features and the calculation criterion; and
determining an order in which the contract should be circulated to a plurality of the users, based on the evaluation values which are calculated for the plurality of users, and presenting the determined order.

* * * * *